UNITED STATES PATENT OFFICE.

WITOLD von SKORZEWSKI, OF SCHLOSS LUBOSTRON, NEAR LABISCHIN, GERMANY.

PROCESS OF TREATING FRESH VEGETABLE MATTER.

1,003,525.      Specification of Letters Patent.     Patented Sept. 19, 1911.

No Drawing.     Application filed January 21, 1908. Serial No. 412,007.

*To all whom it may concern:*

Be it known that I, WITOLD VON SKORZEWSKI, a subject of the Kingdom of Prussia, Germany, residing at Schloss Lubostron, near Labischin, Province of Posen, Prussia, Germany, have invented certain new and useful Improvements in Processes of Treating Fresh Vegetable Matter, of which the following is a specification.

The present invention refers to a process for preparing a durable fodder out of fresh vegetable ingredients as turnip and beet root leaves, grass and the like and to the use of the substance produced by the said process for industrial purposes, for building and insulating purposes, as igniting material, and as fuel and the like. Heretofore fresh vegetables were made durable for preserving by drying them either in the air or by a supply of artificial heat. The thus obtained loose dry fodder has however many disadvantages considering its being stored.

First of all the space required by such fodder is extremely great, furthermore there exists the danger of self-ignition to a considerable extent; also dried beet root leaves form a very brittle and crumbling material, which it is difficult to handle. If furthermore such fodder is stacked in a moist condition it will easily commence to rot and will be eaten with dislike by the cattle if at all, being besides badly digestible; under such circumstances also the danger of self-ignition is very great. For avoiding one or the other of these disadvantages it has been proposed to dry fresh plants after they have been previously chaffed, chopped up, then treated with steam and finally to compress them into cakes if necessary with aid of an agglutinant. The chief disadvantage of this process consists that it necessitates the old method of drying the loose vegetable material, which is very tedious as said above, and also requires the use of presses. On the other hand it has also been proposed to grind the stalks of Indian corn and to dry them or steam them and then to subject them without previous chopping up to a compressing process. The product is in one instance a loose powder, in the other notwithstanding the necessary use of presses owing to the material not having been chopped up a coarse grained crumbling cake.

According to the present invention on the contrary the fresh vegetables are submitted to a mechanical disintegrating process—preferably in one of the known peat disintegrators—until they begin to get a paste like consistence whereupon they are made in form of slabs, cakes, balls or the like and finally dried. In making the cakes it is not necessary to employ an agglutinant nor presses as the material will retain the form it is molded into owing to its pasty consistence and cohere by its natural binding power. For the intended purpose it is of advantage, to treat the stuff before the mechanical disintegration has been completed—preferably in the disintegrator—besides this mechanical treatment with hot steam. The steam will not only promote the disintegration and increase the binding power very considerably but also kill any germs existing in the fresh vegetables likely to produce a rot, so that rotting or fermenting of the same during the disintegration or drying is avoided as far as possible. Such rotting or fermentation, which might be expected, will generally not appear, as practical experiences of long duration have proved, as the outer skin of the cakes will soon harden and form a covering which will protect the pasty core against the effects of the atmosphere and rotting. It has even been found that by the new process fodder can be still utilized, which owing to decomposition having already commenced would not have been eaten by the cattle. Also vegetables like wild oats and similar grasses which the cattle will not eat either in a fresh condition or if dried in form of hay, can be treated with advantage according to the new process, as the mechanical disintegration down to a pasty consistence will remove the disagreeable qualities of these vegetables. The drying may be effected by air or by artificial heat.

The cakes made according to the new process require, compared with the raw material, but very little space, are easily transported, will not be subject to self-ignition and will be gladly eaten by the cattle as has been proved by experience, without these cakes having to be broken up for such feeding.

As is evident from the above, the new process is based upon the fact that a paste made of fresh vegetables will bind also in thick layers owing to its natural binding power.

It has been observed that the thus obtained substance, particularly if made of a very finely cut vegetable material has, besides a cheap price, an extremely small weight, great strength and impermeability against sound, good heat insulating capacity and absorbency, so that it may be employed with advantage for industrial purposes as building and insulating material, with or without reinforcing stiffening rods, woven fabric or the like, as igniting substance, and as fuel. So besides wall coverings insulating linings for transport cases for organic substances, flowers and the like may be made, also nests for fowl and the like.

The accordingly great applicability of the new felted substance of vegetable origin is of great importance for agriculture as it retains besides its qualities as building and insulating material, its full nourishing value, so that the farmer may employ the substance used during the winter for insulating his hot houses, and in spring, when such insulation is no more necessary, as fodder for the cattle, whereby the harder substances are preferably soaked before being fed.

If the fodder quality of the vegetable felt is not required it may be impregnated in any desired manner for increasing its proofness against weather and fire. Of the felt suitably impregnated with asphalt or the like drain pipes may be made, what represents for agriculture a great advantage owing to the saving of the transport costs and the low self costs. The new felt may be used with or without an impregnation with resin or the like as fire lighter or as fuel.

Having now described my invention, what I claim and desire to secure by Letters Patent of the United States is:

1. The process of treating fresh vegetable matter which consists in mechanically comminuting and mixing together the same, and simultaneously steaming the same until the material has assumed a pasty condition, molding the same into a suitable form, and then drying the same.

2. The process of treating vegetable matter, which consists in comminuting and mixing together and steaming the same, molding the same into a cake, and then drying the cake under atmospheric temperature and unconfined.

3. The process of treating fresh vegetable matter, which consists in comminuting and mixing together the same, to bring the matter to a pasty state, simultaneously steaming the same, then forming the same into a cake in a mold without the use of mechanical pressure, then taking the cake immediately from the mold and drying the same unconfined and under atmospheric pressure and temperature.

4. The process of treating fresh vegetable matter which consists in disintegrating the same, until it is ground and mixed together into a pasty mass, then molding the mass into a suitable form, and then drying the same.

5. The process of producing a durable fodder from fresh vegetable forage which consists in comminuting and mixing together the same until it assumes a pasty consistency, and thereupon forming the same into cakes without the use of mechanical pressure, and then drying the same.

6. The process of treating fresh vegetable forage which consists in mechanically comminuting and mixing together the same, and simultaneously steaming the same until the material has assumed a pasty condition, molding the same into suitable form, and then drying the same.

7. The process of treating fresh vegetable forage which consists in comminuting and mixing together and steaming the same, molding the same into a cake, and then drying the cake under atmospheric temperature and unconfined.

8. The process of treating fresh vegetable forage which consists in comminuting and mixing together the same to bring the matter into a pasty state, simultaneously steaming the same, then forming the same into a cake without the use of mechanical pressure, then taking the cake immediately from the mold, and drying the same unconfined and under atmospheric pressure and temperature.

In testimony whereof I have hereunto set my hand in presence of two subscribing witnesses.

WITOLD von SKORZEWSKI.

Witnesses:
  WOLDEMAR HAUPT,
  HENRY HASPER.

---

Copies of this patent may be obtained for five cents each, by addressing the "Commissioner of Patents, Washington, D. C."